May 21, 1963 G. WALTHER, SR 3,090,649
RIM AND WHEEL ASSEMBLIES
Filed May 11, 1960 2 Sheets-Sheet 1

*INVENTOR.*
GEORGE WALTHER, SR.
BY Ely, Frye & Hamilton
ATTORNEYS

May 21, 1963 G. WALTHER, SR 3,090,649
RIM AND WHEEL ASSEMBLIES
Filed May 11, 1960 2 Sheets-Sheet 2

INVENTOR:
GEORGE WALTHER, SR.
BY Ely, Frye & Hamilton
ATTORNEYS 3,090,649
Patented May 21, 1963

3,090,649
RIM AND WHEEL ASSEMBLIES
George Walther, Sr., Dayton, Ohio, assignor to The Dayton Steel Foundry Company, Dayton, Ohio, a corporation of Ohio
Filed May 11, 1960, Ser. No. 28,286
1 Claim. (Cl. 301—13)

The present invention relates to rim and wheel assemblies for trucks and trailers. More particularly, the invention relates to improvements in wheel rim and clamping device constructions providing a more effective mounting of rims in dual fashion on a wheel and maintaining accurate alignment of the dual rims in relation to the wheel during mounting and subsequent operation.

A dual rim and wheel assembly includes the wheel attached to the vehicle axle. The wheel has a plurality of radially extending spokes each of which terminates in a felloe or "felly surface." An "inner rim" is seated on the axially inner portion of the felly surface and an "outer rim" is seated on the axially outer portion of the felly surface. A separating means such as an annular spacer band is located between the rims to provide working clearances for tires mounted on the rim. The assembly of inner rim—spacer band—outer rim is secured to the wheel by fastening means such as bolt supported clamp lugs.

The general object of the invention is to provide an improved rim and wheel construction for positive mounting of dual rims on a wheel so that each rim will seat in a definite and predetermined position on the wheel.

A further object of the invention is to provide an improved rim and wheel construction whereby positively mounted dual rims will be maintained in the mounting alignment despite varying stresses encountered under actual operating conditions.

A further object of the invention is to provide a rim construction including a series of spaced lugs thereon for positive engagement of the rim with either the axially inner portion of the felly surface or the bolt supported fastening means.

These and other objects of the invention, as well as the advantages thereof, over existing and prior art forms, will be apparent in view of the following detailed description and the attached drawings.

Figure 1:
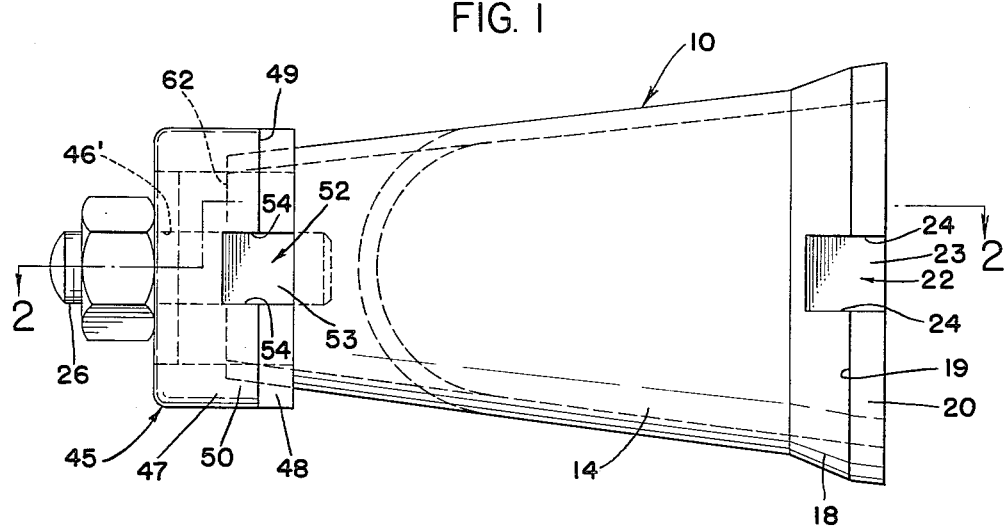
Figure 2:
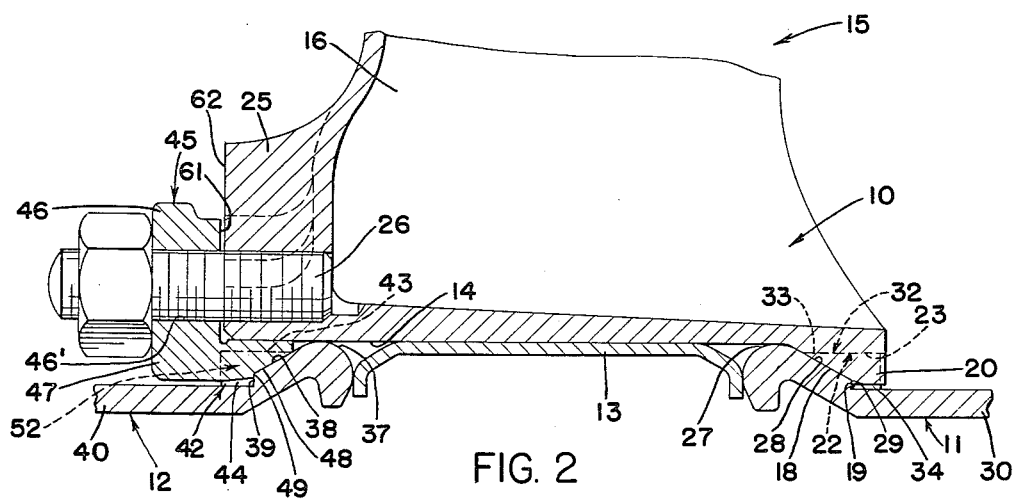
Figure 3:
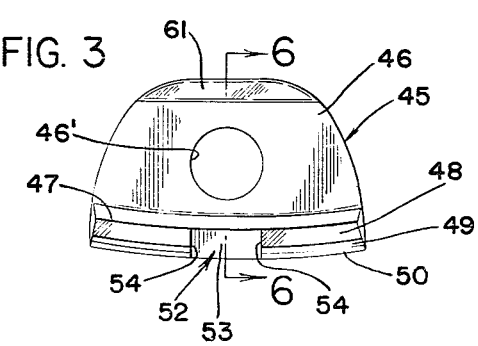
Figure 4:
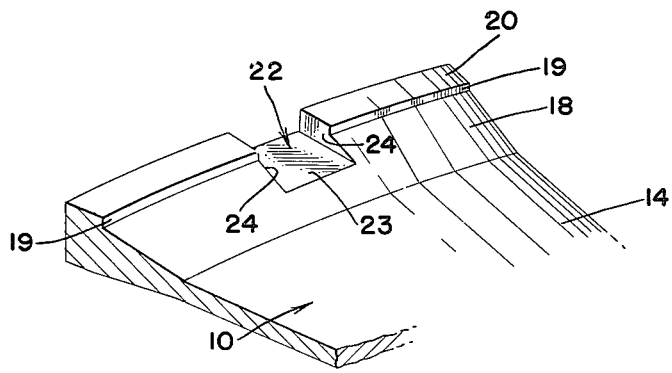
Figure 5:
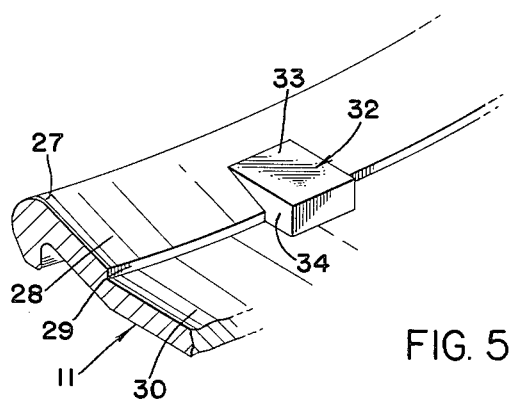
Figure 6:
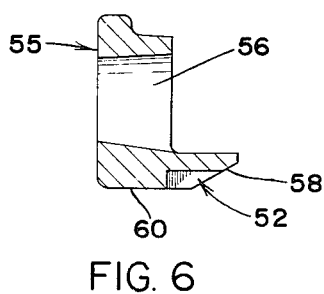

Referring to the drawings:
FIG. 1 is a plan view of a wheel spoke end having a felly surface according to the invention;
FIG. 2 is a partial sectional view taken substantially as indicated on line 2—2 of FIG. 1 showing a dual rim and wheel assembly according to the invention;
FIG. 3 is a plan view of a clamp lug for mounting the assembly of FIG. 2;
FIG. 4 is a fragmentary perspective view of the axially inner portion of the felly surface of the spoke according to the invention;
FIG. 5 is a fragmentary perspective view of the mounting flange of a rim according to the invention; and,
FIG. 6 is a sectional view of a modified form of clamp lug, taken substantially as indicated on line 6—6 of FIG. 3.

An improved rim and wheel assembly according to the invention includes the wheel with a felly surface on the outward ends of any desired number of spoke members extending radially from a hub area. The axially inner portion of each felly has an axially inclined rim mounting surface abruptly terminating in a positioning, orienting or aligning surface defined by the axially outer face of a shoulder on the radially outermost portion of the felly. The axially inner portion of each felly is also provided with a notch extending through the aligning shoulder and the inclined rim mounting surface. The inner rim has at least one mounting flange with surfaces conforming to the inclined rim mounting surface and the positioning surface. The inner rim flange also may have a series of driving lugs conforming to the notch through the shoulder from the rim mounting surface. The inner rim will therefore be seated in a definite and predetermined position on the wheel felly surface.

When the inner rim is mounted on the axially inner portion of the felly surface, an annular spacer band is seated on the medial portion of the felly surface. The outer rim, which preferably has the same form of mounting flange as the inner rim, is mounted on the axially outer portion of the felly surface adjacent the spacer band. The inner rim—spacer band—outer rim are secured to the wheel by a series of bolt supported clamp lugs. The lateral or axially inner portion of each clamp lug has a radially outward end portion conforming with the specially constructed flange of the outer rim. Thus, the radially outer portion of a clamp lug has an axially inner face which acts as a positioning surface and an axially inclined rim engaging surface. When the clamp lugs are tightened, both rims will be securely fastened and maintained in accurate alignment. Preferably, the lugs should "bottom." That is, the lugs should contact the axially outer face of the spoke ends to assure that the rims are aligned perpendicularly to the rotational axis of the wheel.

In the drawings, a representative spoke member is indicated generally by the numeral 10. Referring specifically to FIG. 2, an inner rim 11 and an interchangeable outer rim 12, separated by an annular spacer band 13, are mounted in operative position on felly 14 of a wheel, indicated generally by the numeral 15. The wheel 15 may have any desired number of spokes extending from a conventional hub area (not shown).

The inner rim 11 is carried on a standard (e.g. 28°) axially inclined rim mounting surface 18 on the axially inner portion of the felly surface 14. The surface 18 terminates at the abrupt face 19 of a shoulder 20 on the radially outermost portion of the wheel felly. As shown, the angular disposition of the axially outer face 19 of shoulder 20 is substantially perpendicular to the felly surface (or, the rotational axis of the wheel). However, the angular disposition of face 19 may be varied to any desired extend (e.g., 45 to 135°, in relation to the felly surface 14) so long as the surface of face 19 extends radially outwardly of the rotational axis of the wheel and provides a positive aligning surface against which the inner rim will seat.

As best shown in FIG. 4, a driving notch indicated generally at 22 extends through the shoulder 20 and the mounting surface 18 on the axial center line of each felly. The floor 23 of each notch is preferably parallel to the felly surface 14 and the side walls 24 are preferably perpendicular to the felly surface. However, the depth, axial position, and exact shape of each notch 22 is not critical and therefore may be changed or varied so long as the notches 22 extend axially of the wheel to provide positive driving surfaces to engage the inner rim 11, as described below. Also, if desired each felly may have more than one notch 22 thereon.

The axially outer portion of each spoke member 10 is of conventional construction being provided with one or more bosses 25 carrying stud bolts 26 for attachment of the fastening means such as the clamp lugs.

The diameter of the gutter flange portion 27 of a rim 11 is preferably chosen so that the rim will seat on the rim mounting felly surface 18 near to or adjacent the felly surface 14. Radially outwardly of the gutter flange portion 27, is an inclined surface 28 conforming with the felly surface 18. The axially inner portion of rim surface 28 terminates abruptly at an aligning surface 29 preferably conforming in angular disposition to the felly surface 19. However, it will be noted (see FIG. 2) that the radially outwardly extending surface 29 is longer than its mating surface 19 to provide a clearance for the medial surface 30 of the rim 11 over the felly shoulder 20.

As best shown in FIG. 5, a series of driving lugs indicated generally at 32 extend axially of the rim surface 28 beyond aligning surface 29 and onto medial surface 30. The radially inward surface 33 and the side walls 34 of each driving lug 32 preferably conform to the floor 23 and side walls 24 of the felly driving notch 22.

The outer rim 12 has a mounting flange preferably identical with that of the inner rim 11. The gutter flange 37 has a diameter such that the rim 12 will seat near or adjacent to the axially outer portion of the felly surface 14. The surface 38 extending axially outwardly of the gutter flange portion 37 is inclined at a standard (e.g. 28°) angle. The axially inner portion of rim surfaces 38 terminates abruptly at aligning surface 39 which, as shown, is substantially perpendicular to the rotational axis of the wheel. However, the angular disposition of surface 39 may be varied to the same extent as felly surface 19 and its conforming inner rim surface 29. The medial surface 40 of the rim 12 extends axially outwardly of the wheel.

The outer rim 12 also is provided with a series of driving lugs 42 preferably identical with those of the inner rim. The radially inward surface 43 of each driving lug 42 is preferably parallel to, and the side walls 44 are preferably perpendicular to, the rotational axis of the rim. However, the depth, axial position, and exact shape of each lug 42 may be varied to the same extent as the felly notches 22 and the conforming driving lugs 32 of the inner rim.

Each clamp lug, indicated generally at 45, has a radially oriented upright leg 46 with a slot 46' for the supporting bolt 26. The axially oriented horizontal leg or lateral portion 47 of a clamp 45 has an axially inward axially inclined conical surface 48 for wedging engagement with surface 38 of the outer rim 12. The radially outward portion of surface 48 terminates at an abrupt face 49 conforming with the outer rim aligning surface 39. Axially outwardly of the face 49 the outer face of the clamp is preferably slightly relieved as indicated at 50 to provide clearance for the medial surface 40 of the rim 12.

As best shown in FIG. 3, a driving notch indicated generally at 52 extends on the axial center line of the clamp 45 from the rim engaging surface 48. The notch 52 terminates in the medial portion of the horizontal leg 47 and has a ceiling 53 and side walls 54 conforming with the surface 43 and side walls 44 of the outer rim driving lugs 42.

Referring to FIG. 6, a modified clamp lug 55 suitable for practice of the invention, may have a conically tapered slot 56 for receiving a mounting element such as the bolt 26. Still another modification would be to extend the rim engaging surface 58 radially outwardly to the outer face 60, eliminating the aligning surface 49 such as employed with clamp 45. These modifications in construction permit for flexibility of clamp alignment which is advantageous, particularly with rims that have become slightly distorted due to extreme conditions and stresses encountered during operation.

From the above description, it will be apparent that a wheel and rim assembly according to the invention provides for the positive mounting of interchangeable dual rims on a wheel so that each rim will seat in a definite and predetermined position on the wheel. Because of the positive alignment effected by the mating surfaces 19, 29, on the wheel felly and the inner rim, and the equivalent surfaces 39, 49, on the outer rim and clamp lugs, the rims will be confined to a predetermined orientation. The interaction of the surfaces thereby assures that the rims will be maintained in a plane perpendicular, or nearly so, to the rotational axis of the wheel.

To assure that over-tightening does not occur and to indicate proper rim alignment, the axially inner surface 61 on leg 46 of lug 45 preferably bottoms against the axially outer surface 62 of boss 25. Of course, such a construction entails dimensioning of the wheel, rims, spacer and clamping lugs to utilize the elastic properties of the metals, but the rims are thereby not only confined to a predetermined orientation but also restricted as to their axial displacement.

Therefore, the mounting of rims with tires thereon on the wheels will be greatly simplified in that overtightening of the clamp lugs will be prevented. Such overtightening would lead to improper mounting which easily escapes the eye of the observer when the vehicle stands at rest, but which manifests itself by rim wobble when the vehicle is in motion.

What is claimed is:

In combination, a wheel having a felly surface on the ends of radially extending spoke members, interchangeable inner and outer rims having gutter flanges, an annular spacer band between said rims, and clamp lugs supported by bolts on the outer face of said spoke members;

each wheel felly surface being substantially horizontal and uninterrupted throughout its length, said spacer band having a medial portion slidably engaging said felly surface, each clamp lug having a radially oriented leg adapted to receive the bolts on said spoke members and having an axially inner face 61 on said radial leg, each clamp lug having an axially oriented leg with a radially outer axially inclined mounting surface 48, the axially outer end of said mounting surface intersecting a radially inclined aligning surface 49, a clamp lug notch on the radially outer side of said axial leg extending axially through said mounting surface and said aligning surfaces;

the axially inner end of said felly surface terminating in an axially inclined mounting surface 18, the axially inner end of said mounting surface intersecting a radially inclined aligning surface 19, a series of felly notches extending axially of said wheel through said mounting and aligning surfaces;

the opposed gutter flanges of said rims each having a radially directed aligning surface 29 or 39, the radially inner end of each aligning surface intersecting an axially inclined mounting surface 28 or 38, and a series of lugs extending axially of each said rim from said mounting surface past said aligning surface;

the aligning and mounting surfaces 29, 28 of said inner rim mating with the aligning and mounting surfaces 19, 18 at the inner end of said felly surface, said inner rim lugs engaging said felly notches, the spacer band seating between both of said rims, the mounting and aligning surfaces 38, 39 of said outer rim mating with the mounting and aligning surfaces 48, 49 of said clamp lugs, said outer rim lugs engaging said clamp lug notches, and the axially inner face 61 on the radial legs of said clamp lugs mating with the outer faces 62 of said spoke members when said clamp lugs are drawn into wedging engagement with said outer rim whereby said rims are aligned perpendicularly with respect to the rotational axis of the wheel.

References Cited in the file of this patent
UNITED STATES PATENTS

| | | |
|---|---|---|
| 1,884,936 | Walther | Oct. 25, 1932 |
| 1,945,277 | Kay | Jan. 30, 1934 |
| 2,048,150 | Walther | July 21, 1936 |
| 2,767,026 | Walther | Oct. 16, 1956 |

FOREIGN PATENTS

| | | |
|---|---|---|
| 539,050 | Germany | Nov. 26, 1931 |